United States Patent
Ruefer et al.

(10) Patent No.: US 6,342,294 B1
(45) Date of Patent: Jan. 29, 2002

(54) COMPOSITE PTFE ARTICLE AND METHOD OF MANUFACTURE

(76) Inventors: Bruce G. Ruefer, 623 Mountain View, Bozeman, MT (US) 59718; Leonard G. Marlow, Jr., 3250 Linney Rd., Bozemana, MT (US) 59715; Rebecca U. Ruefer, 623 Mountain View; N. Joe Sharber, 258 E. Baxter Rd., both of Bozeman, MT (US) 59718

( * ) Notice: Subject to any disclaimer, the term of this patent is extended or adjusted under 35 U.S.C. 154(b) by 0 days.

(21) Appl. No.: 09/373,348

(22) Filed: Aug. 12, 1999

(51) Int. Cl.[7] .............................. B32B 5/22; B32B 3/26; B32B 3/00; B32B 7/02
(52) U.S. Cl. ................. 428/317.9; 428/304.4; 428/218; 428/316.6
(58) Field of Search ................ 428/317.9, 304.4, 428/218, 316.6

(56) References Cited

U.S. PATENT DOCUMENTS

| | | | | |
|---|---|---|---|---|
| 5,453,235 A | * | 9/1995 | Calcote et al. | 264/127 |
| 5,545,475 A | * | 8/1996 | Korleski | 428/306.6 |
| 5,879,794 A | * | 3/1999 | Korleski, Jr. | 428/317.1 |
| 6,030,694 A | * | 2/2000 | Dolan et al. | 428/212 |
| 6,143,675 A | * | 11/2000 | McCollam et al. | 442/221 |

* cited by examiner

Primary Examiner—Blaine Copenheaver
Assistant Examiner—Hai Vo
(74) Attorney, Agent, or Firm—Shook, Hardy & Bacon L.L.P.

(57) ABSTRACT

A composite expanded polytetrafluoroethylene (ePTFE) article includes at least two different component layers. At least one of the layers includes a node-fibril structure presenting nodes that are connected together by a first plurality of relatively short fibrils. At least one additional layer of the article includes a plurality of aggregates connected together by a plurality of relatively long fibrils having an average length of greater than about 100 microns. In addition, each of the aggregates are formed of ePTFE, including nodes that are connected together by a second plurality of relatively short fibrils. Preferably, the short fibrils have a length of 10–100 microns, and the nodes found in the article have a density of about 2.0–2.2 grams per cubic centimeter. A method of producing the article includes the steps of extruding a first polytetrafluoroethylene (PTFE) material to form a first extrudate, and extruding a second PTFE material to form a second extrudate, wherein the first PTFE material is more expandable than the second PTFE material. A stack is formed from at least one layer of the first extrudate and at least one layer of the second extrudate, and the stack is expanded and sintered to form the article.

14 Claims, 6 Drawing Sheets

COMPOSITE PTFE ARTICLE AND METHOD OF MANUFACTURE

CROSS-REFERENCE TO RELATED APPLICATIONS

Not Applicable.

STATEMENT REGARDING FEDERALLY SPONSORED RESEARCH OR DEVELOPMENT

Not Applicable.

BACKGROUND OF THE INVENTION

The present invention relates generally to composite articles formed from expanded polytetrafluoroethylene ("ePTFE") materials, and particularly to a composite article made up of a plurality of polytetrafluoroethylene ("PTFE") components having differing expansion characteristics.

Conventional micro porous ePTFE articles are utilized for many useful articles, such as filters, fabrics, gaskets, electrical insulation and human implant devices. These ePTFE articles are typically produced by blending PTFE resin with a lubricant, compressing the blended resin into a billet, extruding the billet into an extrudate, drying the extrudate, calendering the extrudate (if desired), stretching or expanding the extrudate, and sintering the expanded extrudate to form the final article. The ePTFE article can be manufactured in any extruded shape, including sheets, tubes, rods or filaments.

The micro porous structure of known ePTFE articles is characterized by a plurality of nodes that are connected together by a plurality of fibrils. The nodes are essentially solid PTFE, having a density of about 2.0–2.2 grams per cubic centimeter, whereas the density of the expanded material is less than about 2.0 grams per cubic centimeter. Typically, the fibrils of ePTFE materials average in length from about 0.1 microns to about 100 microns, and the volume of the structure occupied by the fibrils has a density ranging from about 2.0 grams per cubic centimeter to less than 0.5 grams per cubic centimeter. The shape, size and orientation of the nodes and fibrils within the structure can be controlled by varying the expansion rate, expansion ratio, number of expansion axes and other processing parameters to yield many different structures. It is also known that properties such as the expandability and microstructure of the expanded article vary with the molecular weight, particle size and other physical characteristics of the PTFE resin. Various methods of producing ePTFE with differing physical properties are described in the literature, e.g. U.S. Pat. No. 3,953,566, to Gore, herein incorporated by reference.

For some applications it is desirable to provide an article having an asymmetric microstructure in which the fibrils adjacent one surface of the article are relatively short in comparison to the fibrils disposed adjacent the opposite surface of the article. However, attempted solutions to this technical problem have been unsatisfactory due to cost and functionability considerations.

BRIEF SUMMARY OF THE INVENTION

It is an object of the present invention to overcome the technical problems found in conventional ePTFE articles exhibiting asymmetric microstructures, and to provide a composite material that is made up of a plurality of PTFE components having differing expansion characteristics and that possesses an advantageous asymmetric microstructure.

In accordance with these and other objects of the present invention, a multi-layered article, such as a sheet, film or tube, of ePTFE is provided which includes at least two different component layers. At least one of the layers includes a node-fibril structure presenting substantially full-density nodes that are connected together by a first plurality of relatively short fibrils. At least one additional layer of the article includes a plurality of aggregates connected together by a plurality of relatively long fibrils having an average length of greater than about 100 microns. Each of the aggregates are formed of ePTFE including substantially full density nodes that are connected together by a second plurality of relatively short fibrils. Preferably, the short fibrils have an average length of 10–100 microns. A method of producing the article includes the steps of extruding a first PTFE material to form a first extrudate, and extruding a second PTFE material to form a second extrudate, wherein the first PTFE material is highly expandable relative to the second PTFE material. A stack is formed from at least one layer of the first extrudate and at least one layer of the second extrudate, and the stack is expanded and sintered to form the article.

The article of the present invention includes an asymmetric structure in which the lengths of the fibrils provided in the structure are longer adjacent one surface of the article than adjacent the opposite surface. Numerous advantages are realized from this construction. For example, by providing a material comprised of at least one layer of a first PTFE material of a relatively high expandability, and at least one layer of a second PTFE material of a relatively low expandability, it is possible to provide an article having an asymmetric microstructure that varies in fibril length across the thickness of the article. As such, the article has application as a biomedical material, a filter architecture, a textile fabric, a biotech cell-culture substrate, and the like.

BRIEF DESCRIPTION OF THE SEVERAL VIEWS OF THE DRAWING

The preferred embodiment of the present invention is described below with reference to the attached drawing figures, wherein.

DETAILED DESCRIPTION OF THE INVENTION

Figure 6:
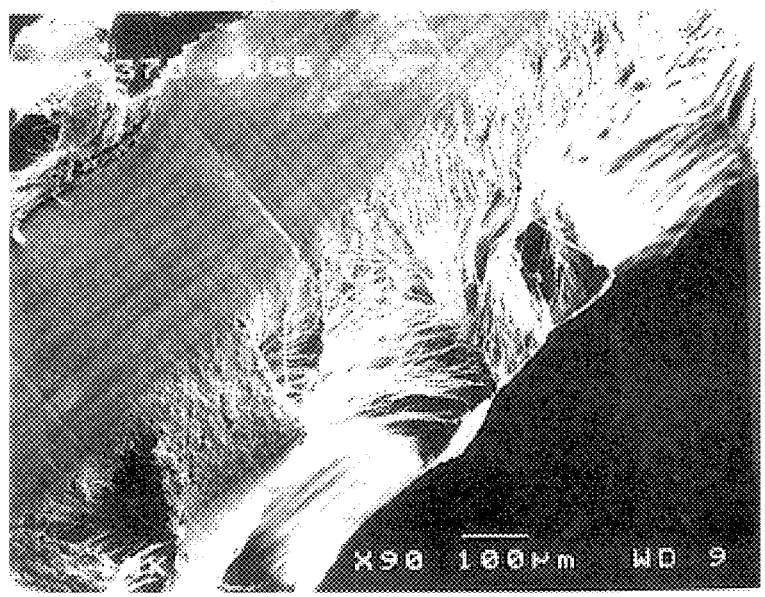
FIG. 6 is a scanning electron microscope photograph at 90× of the composite PTFE article, illustrating a side edge thereof.

A composite article constructed in accordance with the preferred embodiment of the present invention is illustrated in FIG. 6, and broadly includes two component layers that are referred to herein as first and second or inner and outer layers in order to facilitate an understanding of the invention. It is understood that the layers can be reversed or provided in any other desired arrangement, and that more than one layer of either or both of the components, or of a different component, may be provided without departing from the scope of the present invention.

As described in detail below, the article of the present invention is formed of at least two different PTFE components having differing expansion properties. These components are extruded separately, stacked in layers, brought into intimate contact by means of calendering or compressing in a press or die, expanded, and finally sintered. The resulting article has an asymmetric fibril structure, a unique macro-structure, and a unique micro-structure.

The individual components of the inventive article may be brought into intimate contact by any known means, such as by calendering the layered sheets together or by compressing layered sheets in a press or die. While the methods detailed herein illustrate a process for making a composite sheet material, it is not intended to limit the scope of the present invention to sheet materials. Other useful articles, such as rods, tubes, or other layered configurations can be made in a similar manner.

The multi-layered sheet is preferably comprised of two or more layers of separately extruded resins of differing expandability, referred to herein as type H and type L tapes, wherein type H tapes are those exhibiting an expansion characteristic that renders the material more highly expandable than a type L tape. These tapes are stacked in layers, brought into intimate contact by means such as a press or by calendaring, expanded below the crystalline melt point of PTFE, and then sintered.

Examples of expansion characteristics that render the PTFE more or less expandable than another include the molecular weight of the PTFE resin, the partical sizes in the PTFE resin, the lubricant level during extrusion, the dryness of expanded resin, the dye configuration during extrusion, calendering, and expansion conditions including temperature, expansion rates, and expansion speeds. Thus, a PTFE resin with a relatively high molecular weight might be selected to form the layer with the intended higher expandability, whereas a PTFE resin with a lower molecular weight might be selected to form the less expandable layer. Similarly, a PTFE resin with relatively large particle sizes could be selected to make one layer more expandable, whereas a PTFE resin with relatively small particle sizes might be selected to form the layer with the lesser expandability.

A specific formulation of PTFE paste can be produced by extruding a material that is highly expandable (hereinafter referred to as "type H"). The expanded sintered articles produced from this type H material have a normal node and fibril structure as is known, with fibrils typically ranging from about 5 microns to about 10 microns. An extrudate sheet produced from a different formulation of PTFE paste (hereinafter referred to as "type L") can produce a PTFE material that is not as highly expandable. The expanded sintered articles produced from this type L material are difficult to make without fracturing, but when made the structure is a typical node-fibril configuration as is conventional.

When type H and L stacked tapes are expanded together at relatively high expansion ratios, the type H component of the article has unexpectedly long fibril lengths, ranging from about 10 to 30 microns. The L type component does not fracture as it would if expanded alone under the given expansion conditions. Instead, it forms a unique large scale aggregate-fibril structure including aggregates having diameters ranging in size from about 500 to 1000 microns, and fibrils connecting the aggregates together and ranging in average length from about 100 to 1000 microns, and preferably from about 500 to 1000 microns. The aggregates, rather than being essentially solid, are actually composed of a fine scale node-fibril structure, with nodes ranging in size from about 10 microns×10 microns and fibrils ranging in average length from about 10 to 30 microns. Thus, the large scale nodes have a density of less than full density, i.e. less than about 2.0 grams per cubic centimeter, while the fine scale nodes are understood to have a density of about 2.0 to 2.2 grams per cubic centimeter as is known in prior art.

The article of the preferred embodiment has two key characteristics. First, the node-fibril structure of the layer or layers formed from the more expandable type H tape is similar to the node-fibril structure known in the prior art. That is, the nodes are essentially solid PTFE, having a density of about 2.0 to 2.2 grams per cubic centimeter. However, the structure of the layer or layers formed from the less expandable type L tape has a large-scale structure of aggregates and fibrils, not similar in appearance to the previously known node-fibril structures. Further, the large-scale aggregates are actually composed of smaller nodes and fibrils; hence the large scale aggregates have a density of less than about 2.0 grams per cubic centimeter. As such, each aggregate is actually comprised of ePTFE, and these aggregates are connected together by fibrils of a length substantially longer than the fibrils defining the fine scale node-fibril structure of each aggregate.

A second key characteristic of the composite article of the present invention is that the fibril lengths of the two component layers differ, with the type L tape layer having unusually long fibrils connected between the aggregates, while the type H tape component layer has more typical fibril lengths. Furthermore, the type H component layer was found to have unexpected and longer fibril lengths in the composite article than would have been formed had it been expanded and sintered alone.

Figure 1:
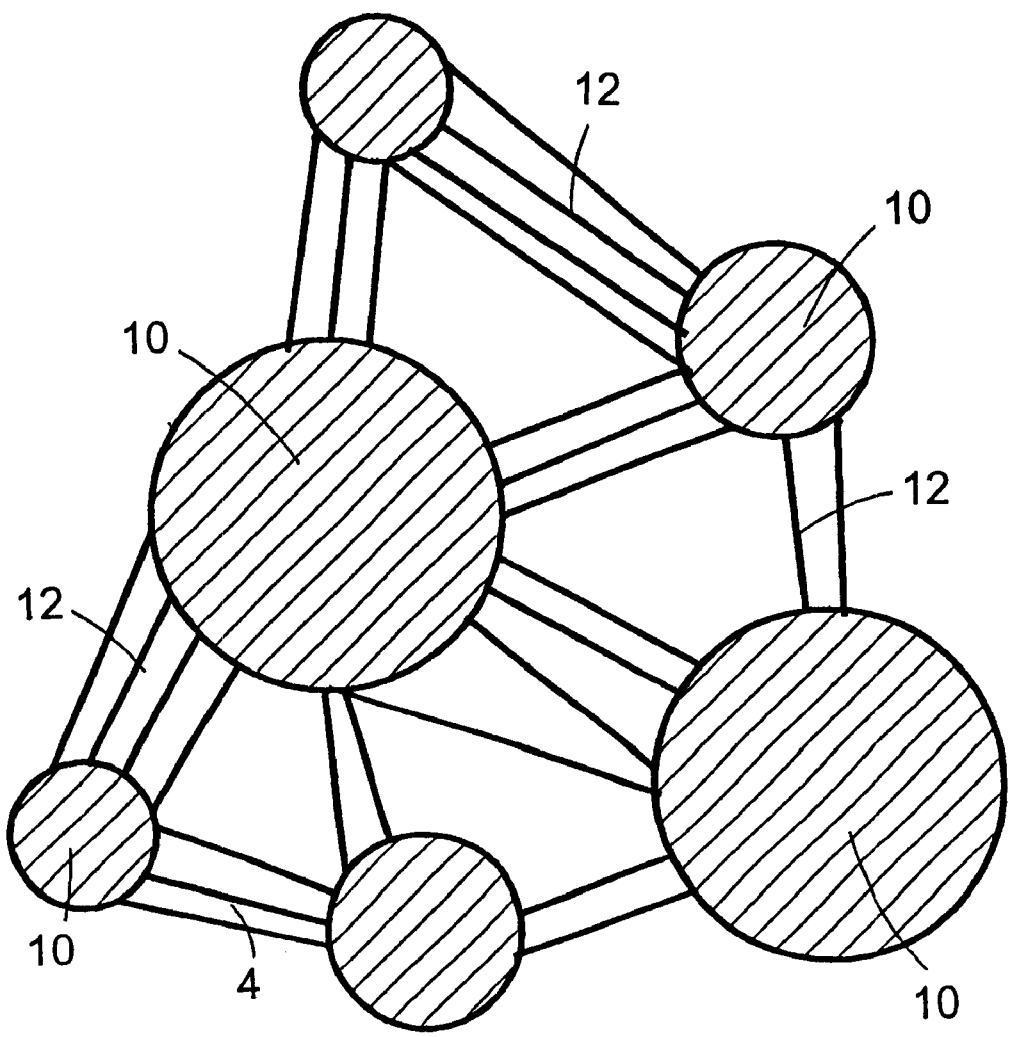
FIG. 1 is a schematic view of a first layer of a composite PTFE article constructed in accordance with the preferred embodiment, illustrating a node-fibril structure of the first layer.
Figure 5:
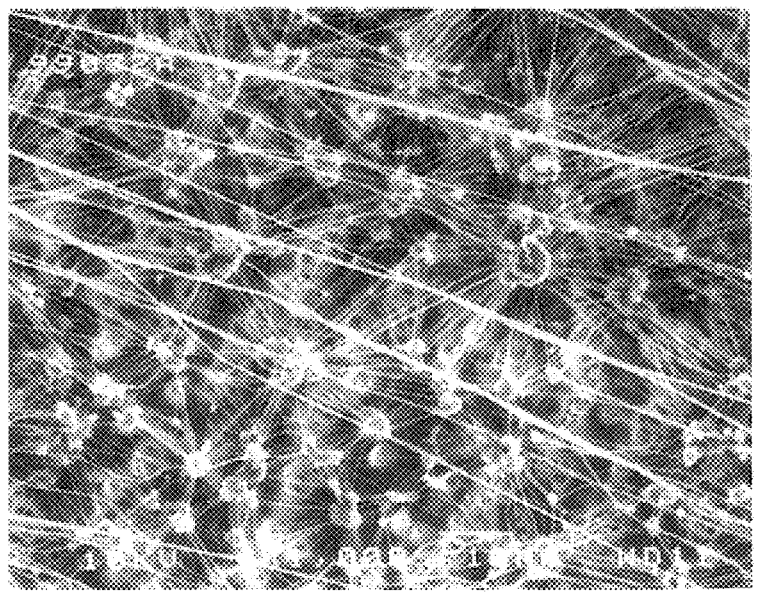
FIG. 5 is a scanning electron microscope photograph at 1000× of the composite PTFE article, illustrating the underlying node-fibril structure of the first layer.

Turning to FIG. 1, the inner layer of the article is illustrated as including a node-fibril structure in which a plurality of nodes 10 are connected together by fibrils 12. The nodes 10 are made of high-density or non-expanded PTFE more typical to normal ePTFE and exhibit a density of about 2.0–2.2 gm/cc. The fibrils 12 of the inner layer connect the nodes together, and typically average 10–30 microns in length. FIG. 5 is a scanning electron microscope photograph at a magnification of 1000×, illustrating the node-fibril structure of the inner layer through the relatively long fibrils of the aggregate-fibril structure of the outer layer.

Figure 2:
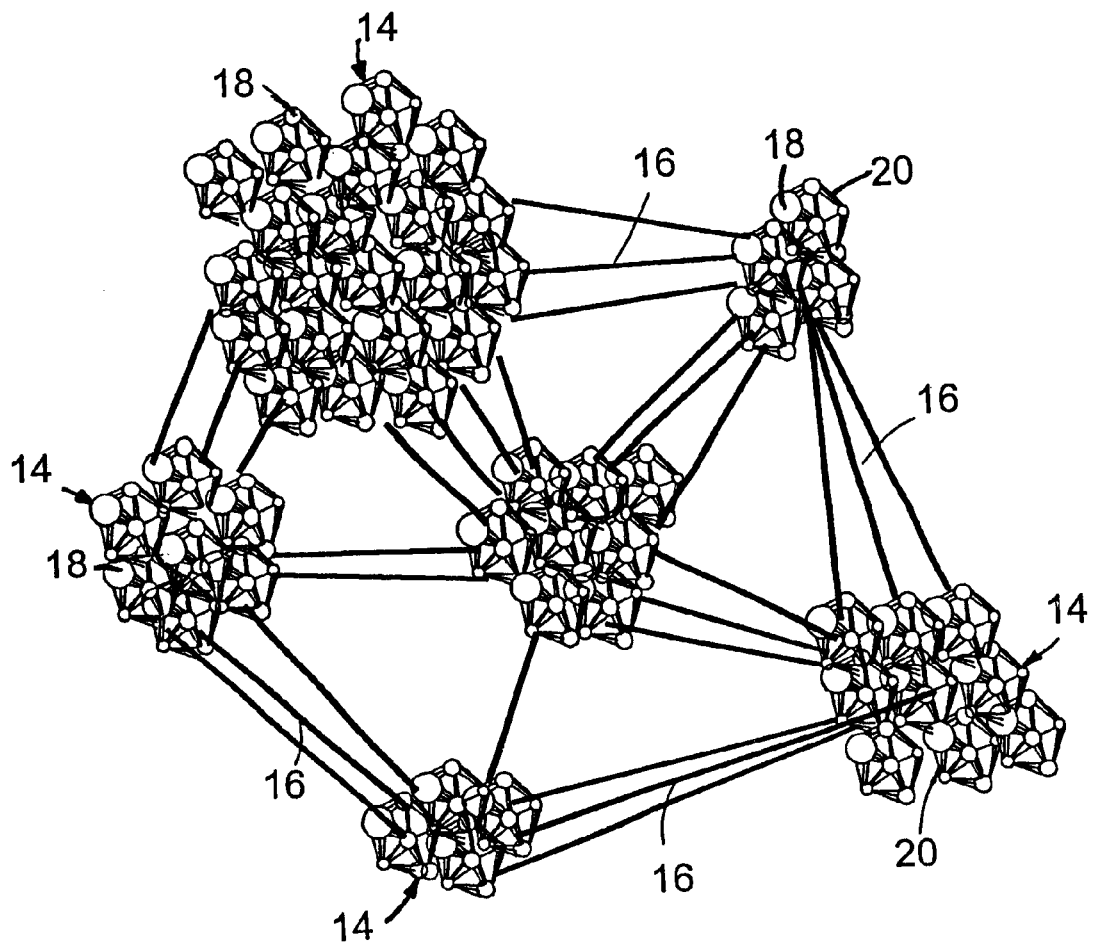
FIG. 2 is a schematic view of a second layer of the composite PTFE article, illustrating an aggregate-fibril structure of the second layer.
Figure 9:
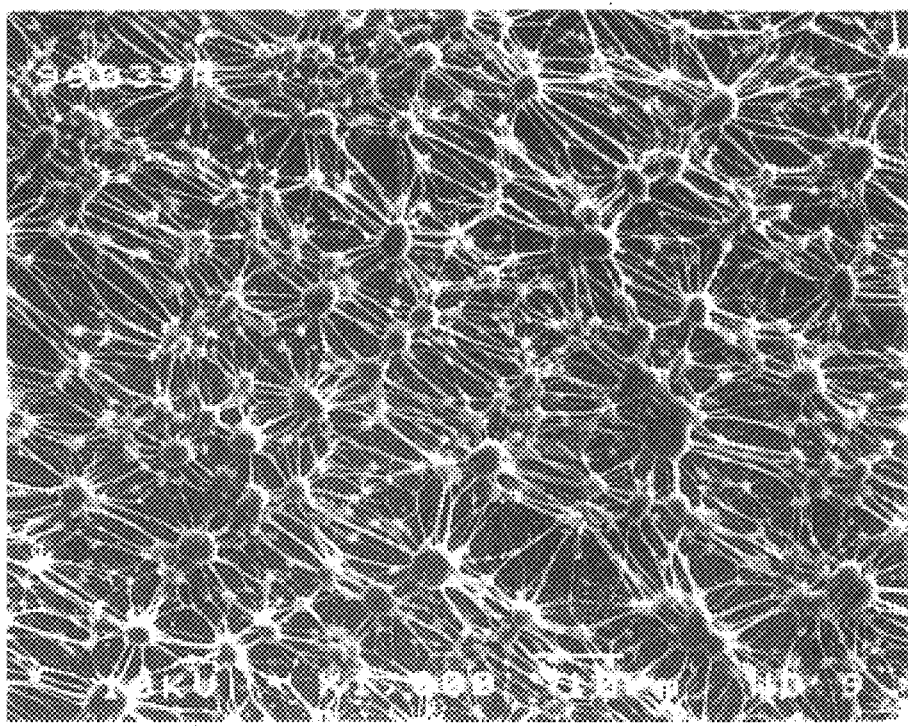
FIG. 9 is a scanning electron microscope photograph at 1000× of the composite PTFE article, illustrating the node-fibril structure of an aggregate of the second layer.

As shown in FIG. 2, the outer layer of the article exhibits an expanded aggregate-fibril structure including aggregates connected to one another and to the inner layer by very long fibrils 16. As shown in FIG. 9, the aggregates each include a fine scale node-fibril structure that resembles the node-fibril structure of the inner layer, including a plurality of nodes 18 connected together by fibrils 20. The nodes 18 are made of high-density or non-expanded PTFE more typical to normal ePTFE and exhibit a density of about 2.0–2.2 gm/cc. The fibrils 20 within the aggregates connect the nodes 18 together, and typically average 10–30 microns in length.

Figure 3:
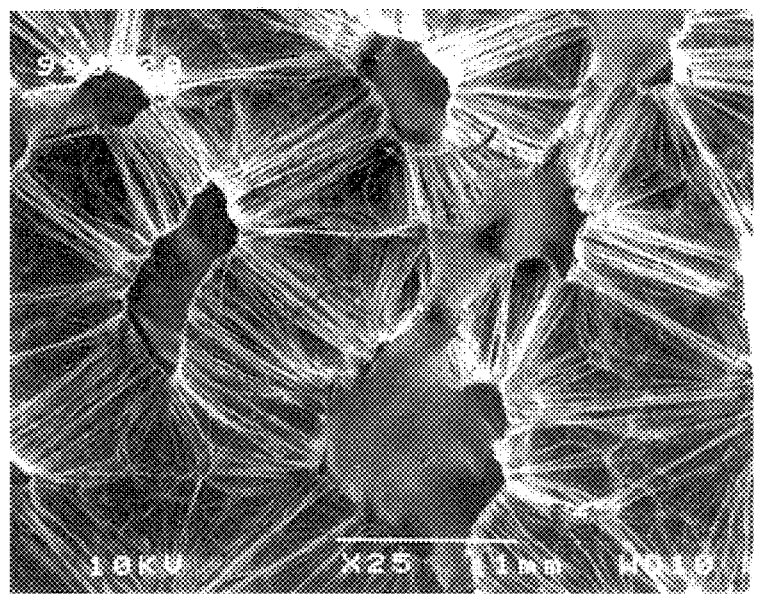
FIG. 3 is a scanning electron microscope photograph at 25× of the second layer of the composite PTFE article, illustrating ePTFE aggregates connected to each other with relatively long fibrils.
Figure 4:
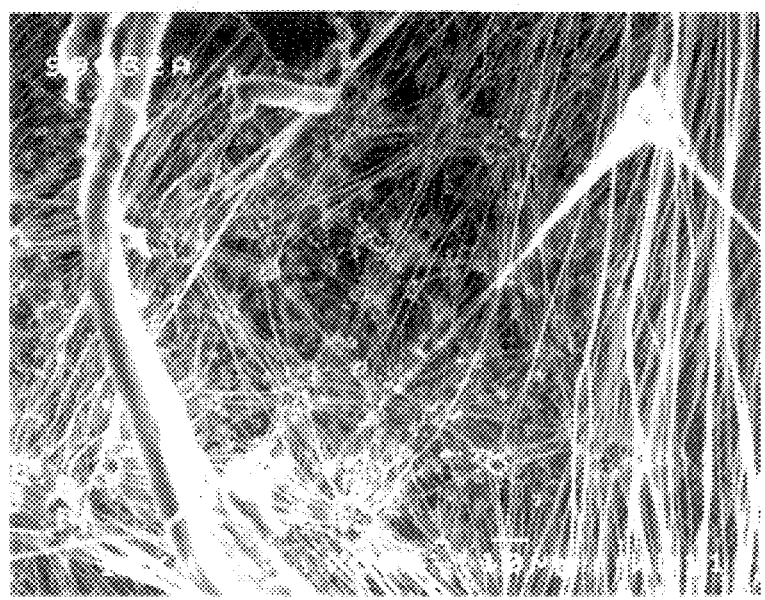
FIG. 4 is a scanning electron microscope photograph at 500× of the composite PTFE article, illustrating the underlying node-fibril structure of the first layer.

As shown in FIG. 3, the relatively long fibrils are connected between the aggregates of the outer layer and average from about 500–1000 microns (about 0.5 to 1 mm) in length. In addition, as illustrated in FIG. 4, the long fibrils of the outer layer connect downward to the underlying node-fibril structure of the first or inner layer, connecting not only the aggregates to one another, but to the underlying inner layer of the article as well.

Figure 7:
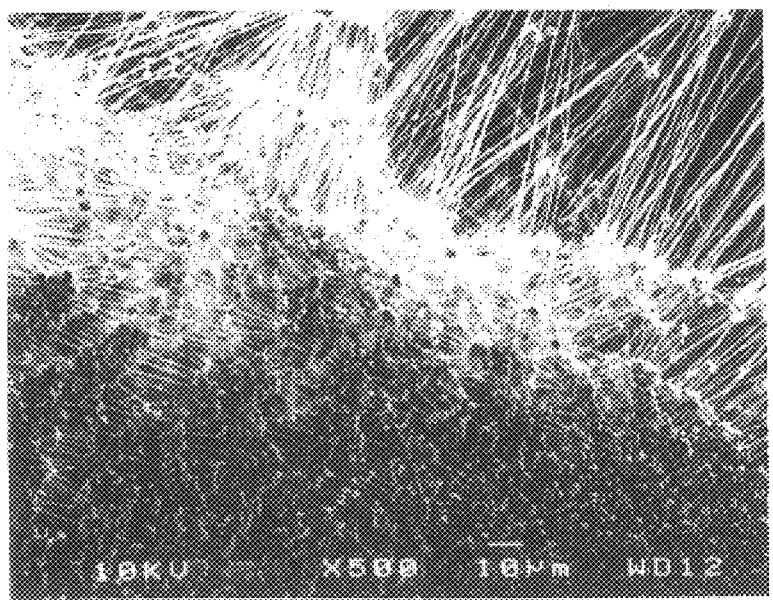
FIG. 7 is a scanning electron microscope photograph at 500× of the composite PTFE article, illustrating a transition area between the aggregates and the long fibrils of the second layer of the article.
Figure 8:
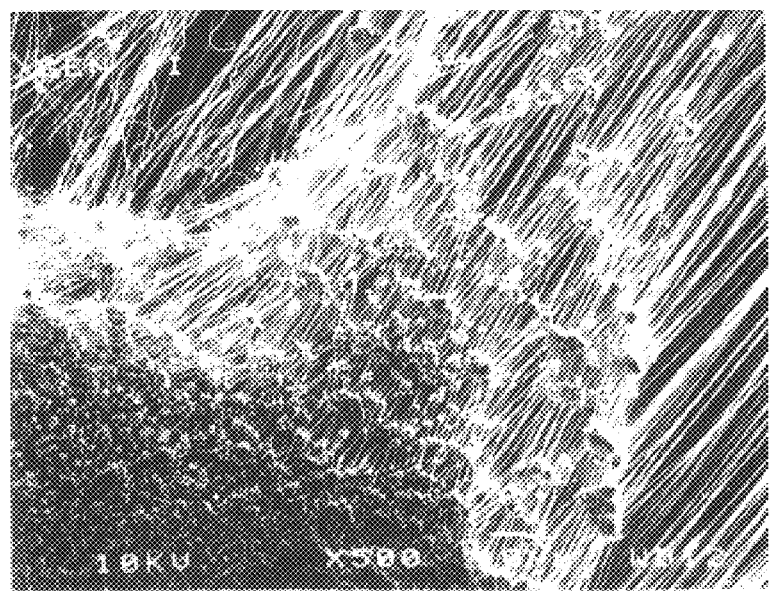
FIG. 8 is a scanning electron microscope photograph at 500× of the composite PTFE article, illustrating the transition area between an aggregate and the long fibrils of the second layer of the article, and depicting the node-fibril structure of the aggregate.

The transition area between an aggregate and the fibrils of the outer layer is illustrated in FIG. 7, and includes both the fine node-fibril structure of the aggregate and the relatively long fibrils that connect the aggregate to other aggregates. As shown in FIG. 8, the high density nodes of the node-fibril structure of the aggregate are connected together by longer and longer fibrils in the transition area, demonstrating the manner in which the material is stretched during formation to create the relatively long fibrils of the layer.

Turning to FIG. 6, the second or outer layer of the composite article is connected to the underlying or inner layer by a large number of the relatively long fibrils of the outer layer across the entire area of the article between the aggregates. The existence of this high density area of the relatively long fibrils in the absence of nodes is considered novel to the present invention, and the advantages of this construction are apparent to those of skill in the art. For example, the high number of fibrils connected between the layers ensures attachment of the outer layer to the underlying structure, enhancing overall strength, and the fibrils function as a natural and stress-dissipating region during flexure of the article.

The method of manufacturing the article of the preferred embodiment broadly includes the steps of extruding two different PTFE components to form first and second extrudates, one of which possesses an expansion characteristic that differs from the other.

A stack is formed from at least one layer of each of the different components, and is calendered to a desired thickness to form a multi-layered sheet. Subsequent to calendering, the sheet is heated in an oven to a temperature below the crystalline melt temperature to remove the mineral spirits, and dried. Thereafter, the dried sheet is expanded, e.g. by a radial expansion process or the like, and is sintered above the crystalline melt temperature of the PTFE to "lock" the structure.

As mentioned above, the suitable characteristics for the invention include a novel macro-structure of expanded ePTFE juxtaposed to a fine or small micro-structure of ePTFE. Macro-structures that exhibit about a 1 mm average fibril length connecting expanded ePTFE aggregates overlying a micro-structure of 20–30 micron fibrils connecting full density PTFE nodes can be made by heat processing the aforementioned expanded assemblies.

EXAMPLE 1

A PTFE resin was blended with a typical amount of mineral spirits (about 100 cc per pound of resin) to form a paste, and the paste was billeted, extruded and calendered in a conventional manner to make a tape of the type H PTFE component. The type H PTFE tape was then stacked into 10 layers, and the stack was calendered to a final thickness of about 0.1 inches. The multi-layered sheet resulting from the calendering step was dried in an oven to remove the mineral spirits, and dried. Thereafter, the dried sheet was radially expanded at an expansion ratio of about 5:1 and at an expansion rate of about 200%/second. The resulting first ePTFE article was sintered above the crystalline melt temperature of the PTFE to "lock" the structure.

A PTFE resin was blended with a high amount of mineral spirits (about 200 cc per pound of resin) and the paste was billeted, extruded, and calendered in a conventional manner to make a tape of the type L PTFE component. The type L PTFE tape was then stacked, calendered, dried, expanded, and sintered as described with reference to the type H PTFE tape, forming a second ePTFE article.

A stack was made of 8 sheets of the type H PTFE component, and a sheet of the type L PTFE component was added to both the top and bottom of the stack. The multi-layered stack was then calendered to a final thickness of about 0.1 inches, forming a sheet that was subsequently dried in an oven to remove the mineral spirits. The dried sheet was then radially expanded and sintered as described above with reference to the first and second ePTFE articles. The results are shown in Table 1.

TABLE 1

| Expansion at 200%/sec and 5:1 ratio | "type H" PTFE Tape Material | "type L" PTFE Tape Material | Preferred Invention PTFE Tape Material |
|---|---|---|---|
| Result | Expanded into typical high density node fibril microstructure. | Fractured and did not expand. | Macro-structure of expanded nodes connected by long fibrils. Superimposed over Microstructure |
| Fibril Length | 5–15-micron | No result. | About 1000 micron macrostructure over a 20–30 micron microstructure. |
| Density | ~0.4 gm/cc | No result. | About 0.2 gm/cc |
| Tensile Strength | About 2000 psi. | No result | About 700 psi. |

The physical characteristics of the preferred invention are given in Table 2.

TABLE 2

| Result of expansion: | Expanded and formed unique node-fibril structure |
|---|---|
| Outer Structure: | Coarse "mm" structure ePTFE; rough to the touch |
| Inner structure: | Fine "micron" structure ePTFE; smooth to the touch |

Although the present invention has been described with reference to the preferred embodiment illustrated in the attached drawing, it is noted that substitutions may be made and equivalents employed herein without departing from the scope of the following claims.

What is claimed is:

1. A composite expanded polytetrafluoroethylene article comprising:

at least one layer of a first polytetrafluoroethylene extrudate having a node-fibril structure including a plurality of nodes having a density of about 2.0–2.2 grams per cubic centimeter; and at least one layer of a second polytetrafluoroethylene extrudate having an aggregate-fibril structure including a plurality of aggregates having a density of less than about 2.0 grams per cubic centimeter, wherein each of the aggregates is composed of a node-fibril structure wherein the nodes have a density of about 2.0–2.2 grams per cubic centimeter.

2. The composite article as recited in claim 1, wherein the first polytetrafluoroethylene includes a greater molecular weight than the second polytetrafluoroethylene such that the first polytetrafluoroethylene is more expandable than the second polytetrafluoroethylene.

3. The composite article as recited in claim 1, wherein the first polytetrafluoroethylene is formed from particles of a first size and the second polytetrafluoroethylene is formed from particles of a second size smaller than the first size such that the first polytetrafluoroethylene is more expandable than the second polytetrafluoroethylene.

4. The composite article as recited in claim 1, wherein the first polytetrafluoroethylene is highly expandable relative to the second polytetrafluoroethylene.

5. A composite expanded polytetrafluoroethylene article comprising:

at least one layer of a first polytetrafluoroethylene material including a first plurality of nodes connected together by a first plurality of fibrils having an average length of about 10–100 microns; and at least one layer of a second polytetrafluoroethylene material including a plurality of aggregates connected together by a second plurality of fibrils having an average length of greater than about 100 microns, each of the aggregates being defined by a second plurality of nodes connected together by a third plurality of fibrils, the third plurality of fibrils having an average length of about 10–100 microns.

6. The composite article as recited in claim 5, wherein the first plurality of nodes have a density of about 2.0–2.2 grams per cubic centimeter.

7. The composite article as recited in claim 5, wherein the plurality of aggregates have a density of less than about 2.0 grams per cubic centimeter.

8. The composite article as recited in claim 5, wherein the second plurality of nodes have a density of about 2.0–2.2 grams per cubic centimeter.

9. The composite article as recited in claim 5, wherein the first polytetrafluoroethylene material is highly expandable relative to the second polytetrafluoroethylene material.

10. A composite expanded polytetrafluoroethylene article comprising:

at least one layer of a first expanded polytetrafluoroethylene material including-a first plurality of nodes connected together by a first plurality of short fibrils; and at least one layer of a second expanded polytetrafluoroethylene material including a plurality of aggregates connected together by a first plurality of long fibrils having an average length of greater than about 100 microns, each of the aggregates being formed of expanded polytetrafluoroethylene material including a second plurality of nodes connected together by a second plurality of short fibrils, the first and second pluralities of short fibrils being short relative to the long fibrils.

11. The composite article as recited in claim 10, wherein the first plurality of nodes have a density of about 2.0–2.2 grams per cubic centimeter.

12. The composite article as recited in claim 10, wherein the plurality of aggregates have a density of less than about 2.0 grams per cubic centimeter.

13. The composite article as recited in claim 10, wherein the second plurality of nodes have a density of about 2.0–2.2 grams per cubic centimeter.

14. The composite article as recited in claim 10, wherein the first polytetrafluoroethylene material is highly expandable relative to the second polytetrafluoroethylene material.

* * * * *